(12) United States Patent
Seok

(10) Patent No.: US 12,342,041 B1
(45) Date of Patent: Jun. 24, 2025

(54) SYSTEM AND METHOD FOR PROVIDING VIDEO

(71) Applicant: RNR Inc., Seoul (KR)

(72) Inventor: Min Cheol Seok, Gwacheon-si (KR)

(73) Assignee: RNR Inc., Seoul (KR)

( * ) Notice: Subject to any disclaimer, the term of this patent is extended or adjusted under 35 U.S.C. 154(b) by 0 days.

(21) Appl. No.: 19/171,277

(22) Filed: Apr. 6, 2025

(30) Foreign Application Priority Data

Aug. 8, 2024 (KR) .......................... 10-2024-0106040

(51) Int. Cl.
| | | |
|---|---|---|
| *H04N 21/4415* | (2011.01) | |
| *G06V 40/16* | (2022.01) | |
| *H04N 21/233* | (2011.01) | |
| *H04N 21/234* | (2011.01) | |
| *H04N 21/258* | (2011.01) | |
| *H04N 21/431* | (2011.01) | |
| *H04N 21/442* | (2011.01) | |

(52) U.S. Cl.
CPC ....... *H04N 21/4415* (2013.01); *G06V 40/161* (2022.01); *G06V 40/178* (2022.01); *H04N 21/233* (2013.01); *H04N 21/23418* (2013.01); *H04N 21/25875* (2013.01); *H04N 21/431* (2013.01); *H04N 21/44218* (2013.01)

(58) Field of Classification Search
CPC ............. H04N 21/4415; H04N 21/233; H04N 21/23418; H04N 21/25875; H04N 21/431; H04N 21/44218; G06V 40/161; G06V 40/178
USPC .......................................................... 725/10
See application file for complete search history.

(56) References Cited

U.S. PATENT DOCUMENTS

| | | | |
|---|---|---|---|
| 2016/0248766 A1 | 8/2016 | Tembey et al. | |
| 2021/0117656 A1 | 4/2021 | Garcia | |
| 2022/0172005 A1* | 6/2022 | Coviello | ............... G06F 9/5027 |

FOREIGN PATENT DOCUMENTS

| | | |
|---|---|---|
| JP | 2020-201441 A | 12/2020 |
| KR | 10-2021-0088922 A | 7/2021 |
| KR | 10-2478139 B1 | 12/2022 |

* cited by examiner

*Primary Examiner* — Adil Ocak

(74) *Attorney, Agent, or Firm* — Revolution IP, PLLC

(57) ABSTRACT

Provided are a system (100) and method for providing a video, wherein the system (100) includes a display (110) disposed in a viewer space, a video recorder (120) disposed in the display (110) or the viewer space, one or more viewer terminals (130) configured to provide a video to the display (110), and a server (140) configured to communicate with the display (110), the video recorder (120), and the viewer terminals (130) and provide an externally received video to the display (110) or the viewer terminals (130).

5 Claims, 3 Drawing Sheets

SYSTEM AND METHOD FOR PROVIDING VIDEO

CROSS-REFERENCE TO RELATED APPLICATION

This application claims priority to and the benefit of Korean Patent Application No. 10-2024-0106040 filed on Aug. 8, 2024, the disclosure of which is incorporated herein by reference in its entirety.

BACKGROUND

1. Field of the Invention

The present invention relates to a system and method for providing a video.

2. Discussion of Related Art

Commercial videos, such as movies, generally start being screened in theaters, and after the screening is finished, the commercial videos are sequentially released through Internet protocol television (IPTV) services, over the top (OTT) services, and TV services.

This is because the revenue of a movie producer or distributor is derived from the admission fee of each individual viewer.

Therefore, viewers have to wait a certain amount of time to watch a video on their personal display devices, such as a TV, a mobile phone, a personal computer (PC), and the like, at home or in their car (informal content provision spaces) rather than in a movie theater.

Meanwhile, since the COVID-19 pandemic, people have increasingly preferred to spend their leisure time in private spaces like their homes or cars (informal content provision spaces) rather than in public places like movie theaters.

To reflect these needs of people and the revenue structure of video production companies or distribution companies, the applicant has devised a technical idea for counting the number of purchasing viewers in an informal content provision space ("Method and apparatus for managing people of smart content providing system," Korean Patent Registration No. 10-2478139).

However, viewer counting only occurs at the beginning of a video, which may result in inaccurate viewer counting.

In addition, since videos have age restrictions for viewers to ensure the public concern and ethics of the video and to protect minors from harmful media through a video rating system, it is necessary to effectively protect minors from the harmful effects of explicit or violent videos.

However, according to the related art, viewers are simply authenticated as adults using only cellphones that they have, and thus it is impossible in practice to restrict viewing of minors with cellphones issued to adults.

SUMMARY OF THE INVENTION

The present invention is directed to providing a system and method for providing a video that count the number of viewers such that the viewers may watch a video which is being played in an informal content provision space, such as a home or vehicle, and also utilize an automated authentication system to protect minors from the harmful effects of explicit or violent videos in practice.

According to an aspect of the present invention, there is provided a system for providing a video, the system including a display disposed in a viewer space, a video recorder disposed in the display or the viewer space, one or more viewer terminals configured to provide a video to the display, and a server configured to communicate with the display, the video recorder, and the viewer terminals and provide an externally received video to the display or the viewer terminals.

The server includes a video transmitter configured to provide the externally received video to the display or the viewer terminals, an image processor configured to generate time-series video frames from a viewer space video received from the video recorder and separate and extract faces of viewers from the generated video frames, and a counter configured to calculate the number of viewers from the faces of the viewers extracted by the image processor.

The server further includes an age estimator configured to estimate an age of each individual from facial information of the viewers generated by the image processor using a facial recognition algorithm.

The server further includes an authentication mark provider configured to provide an authentication mark to the display when an age of a viewer estimated by the age estimator is lower than an age limit of the externally received video, and a first age verifier configured to receive an authentication signal of at least one viewer terminal which has photographed the authentication mark displayed on the display and check personal information including an age in conjunction with a communication service provider of the viewer terminal from which the authentication signal has been received.

The server further includes an authentication mark provider configured to provide an authentication mark to the display when an age of a viewer estimated by the age estimator is under an age limit of the externally received video, and a second age verifier configured to receive a recorded voice signal of a viewer from the at least one viewer terminal which has photographed the authentication mark displayed on the display and estimate the age through a voice recognition algorithm.

The server may further include a video modifier configured to stop providing the video or partially mosaic the video provided on the display or partially remove sound from the video in accordance with preset viewing restriction information when at least one viewer is under the age limit of the video.

According to another aspect of the present invention, there is provided a method of providing a video, the method including a first operation of receiving booking information including a video to be watched and the number of viewers from a viewer terminal, a second operation of counting the number of actual viewers using a viewer space video received through a display or a video recorder disposed in a viewer space, a third operation of receiving a payment from the viewer terminal for screening the video in accordance with the number of viewers when the booking information corresponds to the counted number of viewers, and a fourth operation of providing an externally received video to the display or the viewer terminal.

The method may further include, after the fourth operation, a fifth operation of additionally receiving a payment for screening the video in accordance with the added number of viewers when the number of actual viewers increases.

The second operation may further include a 2-1 operation of estimating an age of each individual of the counted actual viewers using a facial recognition algorithm, a 2-2 operation of providing an authentication mark to the display when an age of a viewer estimated by the age estimator is lower than an age limit of the externally received video, and a 2-3 operation of receiving an authentication signal of at least one viewer terminal that has photographed the authentication mark displayed on the display and checking personal information including an age in conjunction with a communication service provider of the viewer terminal from which the authentication signal has been received.

The second operation may further include a 2-4 operation of receiving a recorded voice signal of a viewer from the at least one viewer terminal that has photographed the authentication mark displayed on the display and estimating the age through a voice recognition algorithm, and the fourth operation may include, when at least one viewer is under the age limit of the video, stopping providing the video or partially mosaicking the video provided on the display or partially removing sound from the video in accordance with preset viewing restriction information.

BRIEF DESCRIPTION OF THE DRAWINGS

The above and other objects, features and advantages of the present invention will become more apparent to those of ordinary skill in the art by describing exemplary embodiments thereof in detail with reference to the accompanying drawings, in which.

DETAILED DESCRIPTION OF THE INVENTION

Figure 1:
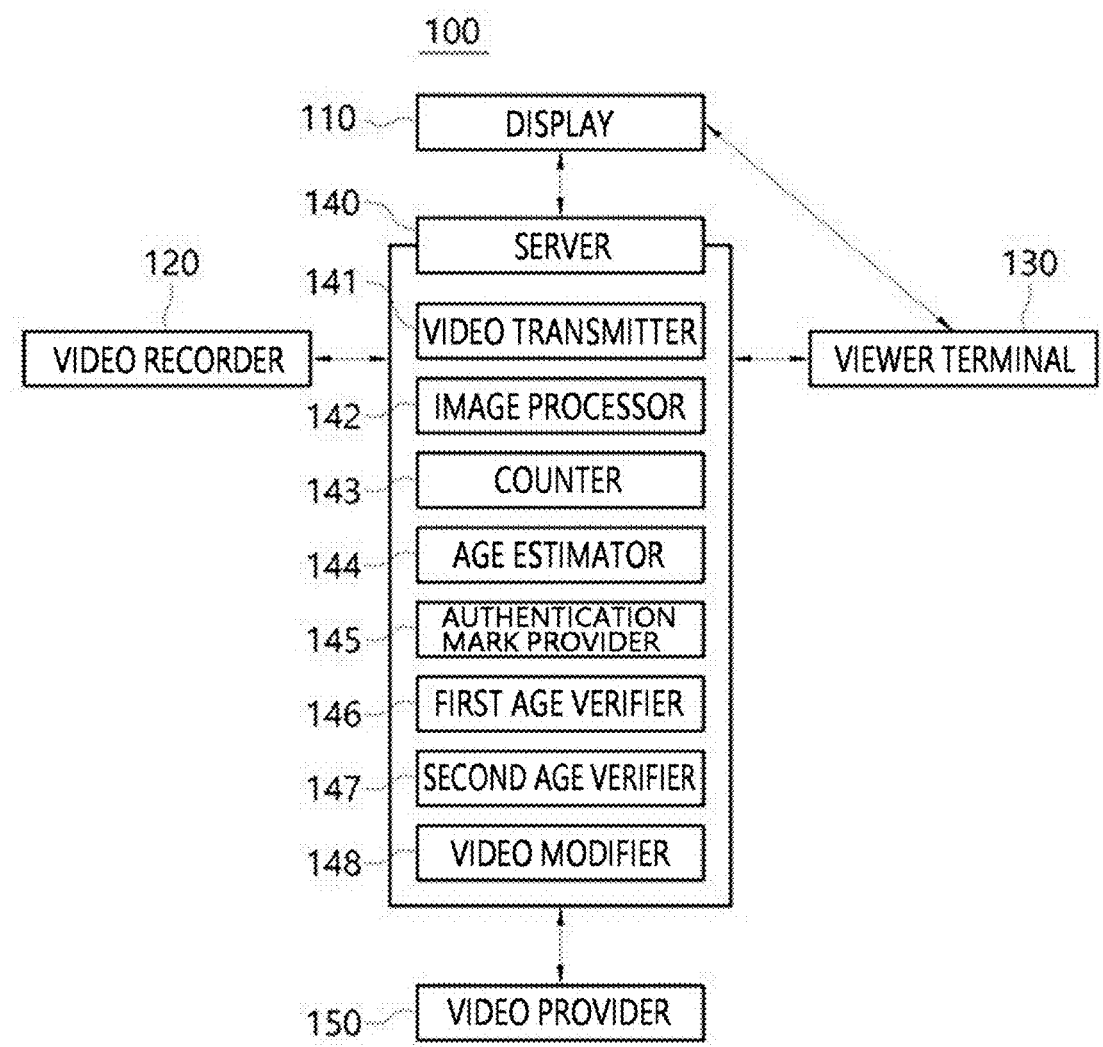
FIG. 1 is a schematic block diagram of a system for providing a video according to an exemplary embodiment of the present invention.

Hereinafter, exemplary embodiments of the present invention will be described in detail with reference to the accompanying drawings.

Unless otherwise defined, all terms used herein have the same meanings as the ordinary meanings thereof as understood by those of ordinary skill in the art, and when any term used herein conflicts with the ordinary meaning thereof, a definition made herein will be used.

However, the following description is only intended to describe exemplary embodiments of the present invention and is not intended to limit the scope of the present invention. Throughout the specification, the same reference numerals refer to the same components.

FIG. 1 is a schematic block diagram of a system for providing a video according to an exemplary embodiment of the present invention.

Referring to FIG. 1, a system 100 for providing a video according to an exemplary embodiment of the present invention may schematically include a display 110, a video recorder 120, a viewer terminal 130, a server 140, and a video provider 150.

The display 110 may be disposed in a viewer space. Here, the viewer space may be any space in which a viewer may watch a video (e.g., inside a building, inside a vehicle, or the like).

The display 110 may receive a video signal from the server 140 which will be described below, and display the video signal on a screen. The display 110 may be installed at a location that is easily recognizable by a user, and may be a small embedded computer including a display panel and a wireless communication function or may be a liquid crystal display (LCD) of the viewer terminal 130 which will be described below.

The video recorder 120 may be disposed in the display 110 or the viewer space and may image the space for a viewer to watch a video.

The viewer terminal 130 may include the display 110 or provide a video to the display 110 which is separately disposed. Since there may be a plurality of viewers, the number of viewer terminals 130 may be one or more.

Here, a terminal may access the server 140 at a remote location or another terminal via a network. A terminal may be, but is not limited to, a cellular phone, a personal communication service (PCS) phone, a personal digital assistant (PDA), a wireless application protocol (WAP) phone, a smartphone, or a tablet.

The server 140 may communicate with the display 110, the video recorder 120, and the viewer terminal 130 and provide an externally received video to the display 110 or the viewer terminal 130.

Specifically, the server 140 may include a video transmitter 141, an image processor 142, a counter 143, an age estimator 144, an authentication mark provider 145, a first age verifier 146, a second age verifier 147, and/or a video modifier 148.

The video transmitter 141 may provide the video received from the outside, such as the video provider 150 which will be described below, to the display 110 or the viewer terminal 130.

The image processor 142 may generate time-series video frames from a viewer space video received from the video recorder 120 and separate and extract faces of people from the generated video frames.

The counter 143 may calculate the number of people from the faces of the people generated by the image processor 142.

In other words, the image processor 142 may generate time-series video frames at preset time intervals, and the counter 143 may recognize a change in the number of viewers while the video content is screened, such that the viewing fee can be accurately paid in accordance with the number of viewers.

Further, the age estimator 144 may estimate the age of each individual from facial information of the people generated by the image processor 142 using a facial recognition algorithm.

The facial recognition algorithm may be a deep-learning-based learning algorithm.

When the age of a viewer estimated by the age estimator 144 is lower than an age limit of the externally received video content, the authentication mark provider 145 may provide an authentication mark to the display 110.

Here, the authentication mark may be a sign, a letter, a figure, and/or the like or may be any generated mark such as a quick response (QR) code.

Also, the authentication mark may include text that instructs a viewer terminal 130 of a viewer to perform authentication.

For example, the authentication mark may include the content "Please verify your age through the terminal of the person who paid for this video," or the text "The age of the person wearing the blue hat is uncertain; please verify his/her age through the terminal" or the like.

The first age verifier 146 may receive an authentication signal of at least one viewer terminal 130 that has photographed the authentication mark displayed on the display 110, and may check personal information including the age in conjunction with a communication service provider of the viewer terminal 130 from which the authentication signal has been received.

However, the viewer terminal 130 in the possession of a minor may not be in his or her name. Accordingly, age verification based on this communication service provider-linked method alone may be insufficient to protect minors from explicit or violent videos.

The second age verifier 147 may receive a recorded voice signal of a viewer from the at least one viewer terminal 130 that has photographed the authentication mark displayed on the display 110, and estimate the age through a voice recognition algorithm.

The voice recognition algorithm may be a deep-learning-based learning algorithm.

When at least one viewer is under the age limit of the video content, the video modifier 148 may stop providing the video or may partially mosaic the video provided on the display 110 or partially remove sound from the video in accordance with preset viewing restriction information.

Due to this multifaceted verification and video modification, the present invention can protect minors from explicit or violent videos.

The video provider 150 externally provides the video to the server 140 and may be, for example, a terminal of a video production company or distribution company.

This system 100 for providing a video according to the present invention may be utilized according to the following method.

Figure 2:
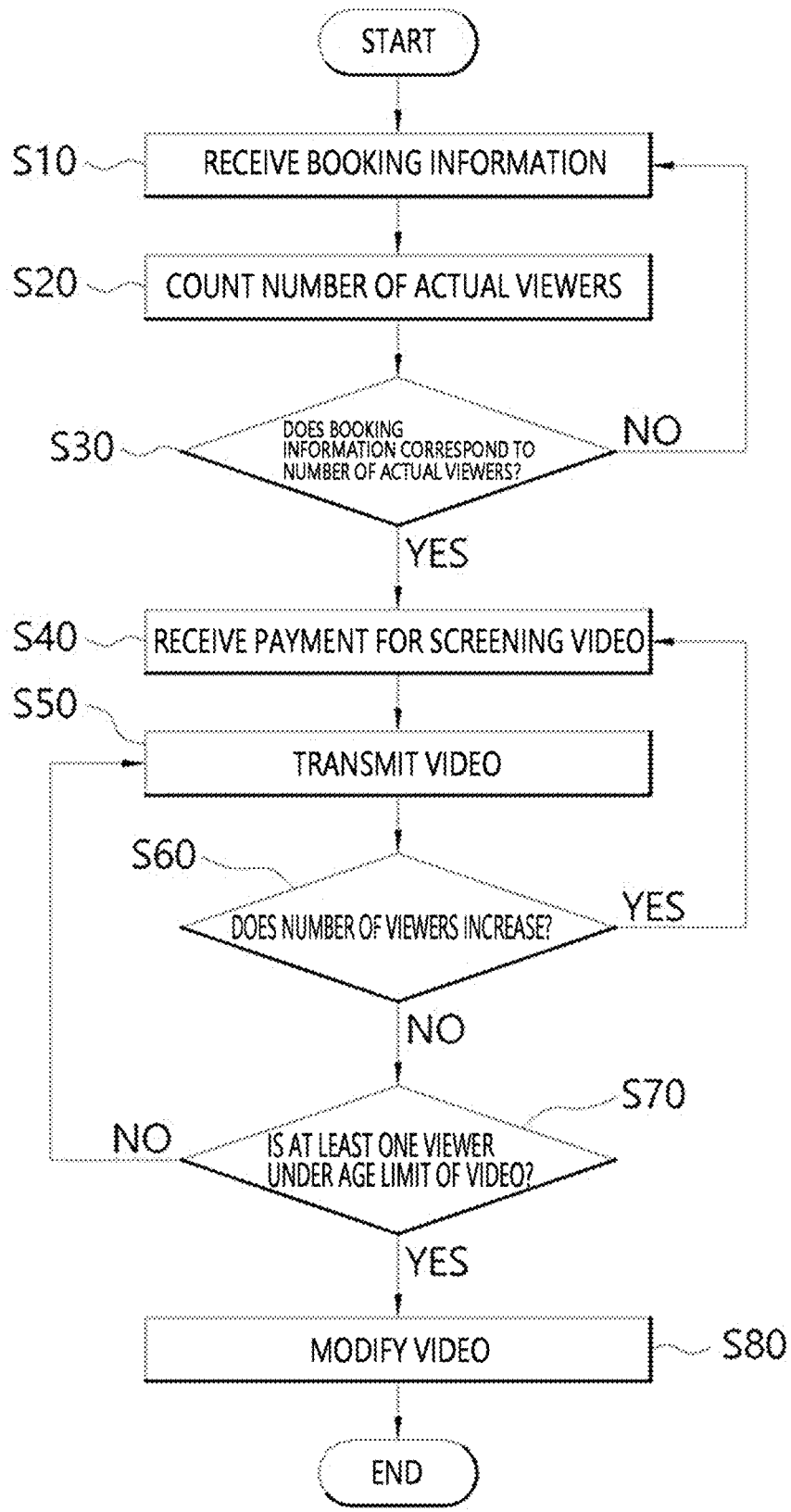
FIG. 2 is a schematic flowchart of a method of providing a video according to an exemplary embodiment of the present invention.
Figure 3:
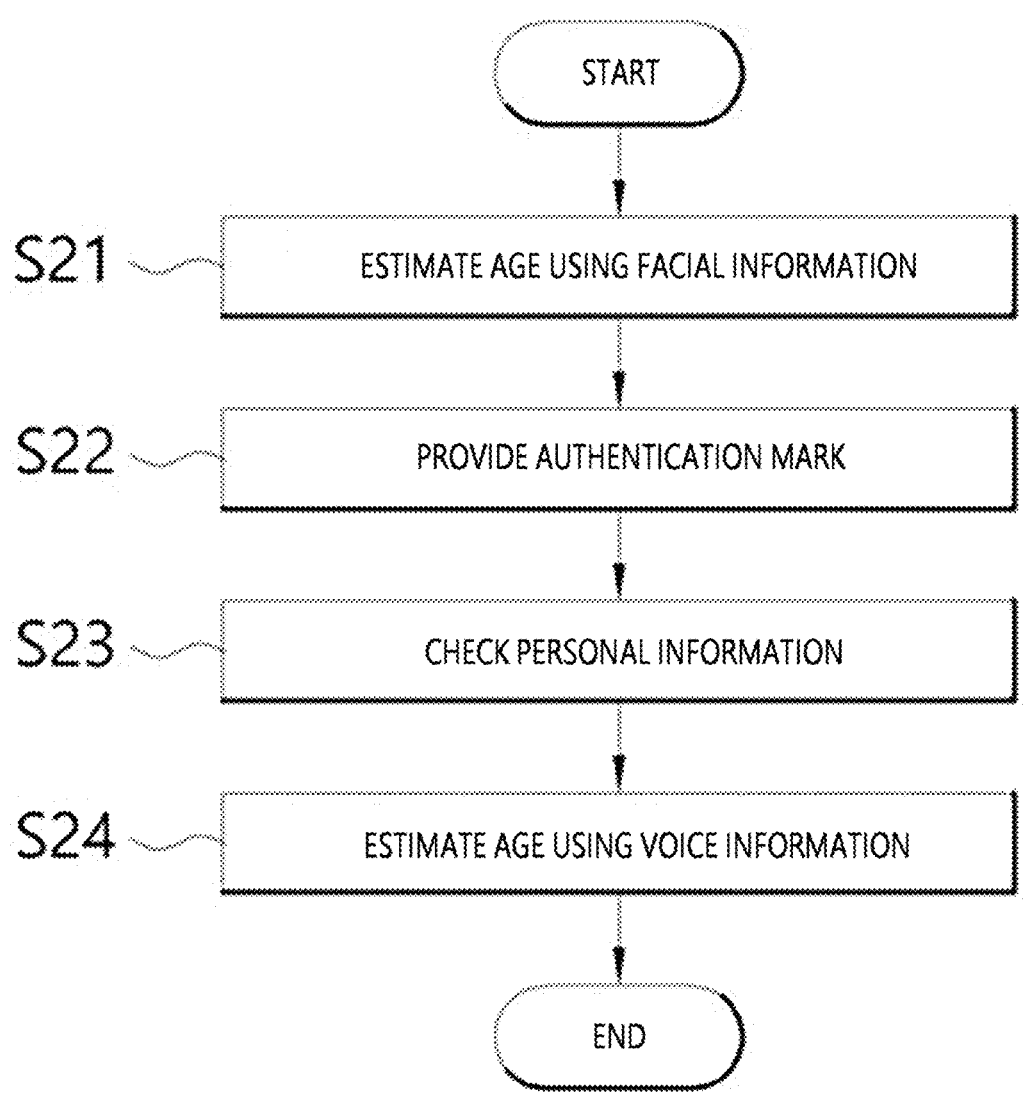
FIG. 3 is a detailed flowchart of a second operation of FIG. 2.

FIG. 2 is a schematic flowchart of a method of providing a video according to an exemplary embodiment of the present invention, and FIG. 3 is a detailed flowchart of a second operation of FIG. 2.

First, the server 140 may receive booking information including a video to be watched and the number of viewers from a viewer terminal 130 (S10).

Subsequently, the server 140 may count the number of actual viewers using a viewer space video received through the display 110 or the video recorder 120 disposed in a viewer space (S20).

Specifically, the image processor 142 of the server 140 may perform image processing on people's faces in video information acquired from the video recorder 120 disposed in the viewer space and calculate the number of viewers.

Also, the server 140 may estimate the age of each individual from the image-processed faces of the people, that is, the actual viewers counted using facial information, using a facial recognition algorithm (S21).

When an age of a viewer estimated by the age estimator 144 is lower than an age limit of an externally received video, the server 140 may provide an authentication mark to the display 110 (S22).

In this case, the server 140 may receive an authentication signal of at least one viewer terminal 130 that has photographed the authentication mark displayed on the display 110, and may check personal information including the age in conjunction with a communication service provider of the viewer terminal 130 from which the authentication signal has been received (S23).

For example, the server 140 may perform age verification in conjunction with a communication service provider of a viewer terminal 130 of a person who has requested or paid for the video and/or perform age verification through a viewer terminal 130 of a person who is estimated to be under the age limit.

However, the viewer terminal 130 may not be in the person's name. Accordingly, when the age of a viewer estimated using facial information is under the age limit, the server 140 may receive a recorded voice signal of the viewer from at least one viewer terminal 130 that has photographed the authentication mark displayed on the display 110, and may estimate the age through a voice recognition algorithm (S24).

Subsequently, when it is determined that each individual viewer is not under the age limit or there is a guardian who has been authenticated as an adult and the booking information corresponds to the counted number of viewers (S30), the server 140 may receive a payment from the viewer terminal 130 for screening the video in accordance with the number of viewers (S40).

Subsequently, the server 140 may provide the externally received video to the display 110 (S50).

Subsequently, the server 140 may perform image processing on a video received from the video recorder 120 in real time and count the number of viewers at preset time intervals. When the actual number of viewers increases (S60), the server 140 may additionally receive a payment for screening the video in accordance with the added number of viewers (S40).

In addition, when at least one viewer is under the age limit of the video (S70), the server 140 may stop providing the video or partially mosaic the video provided on the display or partially remove sound from the video in accordance with preset viewing restriction information (S80).

In brief, according to the present invention, a viewer can watch a video, which is commercially being played, soon in a private place rather than a public place without time and space constraints, and a video production company or distributor can count the number of viewers in real time and receive a reasonable payment for providing the video in accordance with the number of viewers.

In addition, according to the present invention, when a video has an age limit, perfunctory age verification is not performed, but practical age verification is performed through facial recognition and/or voice recognition. Accordingly, it is also possible to prevent explicit or violent videos from being transmitted to minors.

It will be apparent to those skilled in the art that various modifications and alterations can be made without departing from the technical spirit of the present invention. The technical scope of the present invention is not limited to the description of embodiments and should be defined by the claims and an equivalent range thereof.

What is claimed is:

1. A system (100) for providing a video, the system comprising:
    a display (110) disposed in a viewer space;
    a video recorder (120) disposed in the display (110) or the viewer space;
    one or more viewer terminals (130) configured to provide a video to the display (110); and
    a server (140) configured to communicate with the display (110), the video recorder (120) and the viewer terminals (130) and provide an externally received video to the display (110) or the viewer terminals (130),
    wherein the server (140) comprises:
    a video transmitter (141) configured to provide the externally received video to the display (110) or the viewer terminals (130);
    an image processor (142) configured to generate time-series video frames from a viewer space video received from the video recorder (120) and separate and extract faces of people from the generated video frames;

a counter configured to calculate a number of viewers from the faces of the people extracted by the image processor (142);

an age estimator (144) configured to estimate an age of each individual from facial information of the viewers generated by the image processor (142) using a facial recognition algorithm;

an authentication mark provider (145) configured to provide an authentication mark to the display (110) and text instructing a viewer terminal (130) of a specific viewer to perform authentication when an age of a viewer estimated by the age estimator (144) is lower than an age limit of the externally received video;

a first age verifier (146) configured to receive an authentication signal of at least one viewer terminal (130) that has photographed the authentication mark displayed on the display (110) and check personal information including an age in conjunction with a communication service provider of the viewer terminal (130) from which the authentication signal has been received; and a second age verifier (147) configured to receive a recorded voice signal of a viewer from the at least one viewer terminal (130) which has photographed the authentication mark displayed on the display (110) and estimate an age through a voice recognition algorithm.

2. The system (100) of claim 1, further comprising a video modifier (148) configured to stop providing the video or partially mosaic the video provided on the display (110) or partially remove sound from the video in accordance with preset viewing restriction information when at least one viewer is under the age limit of the video.

3. A method of providing a video, the method comprising:

a first operation of receiving booking information including a video to be watched and a number of viewers from a viewer terminal (130);

a second operation of counting a number of actual viewers using a viewer space video received through a display (110) or a video recorder (120) disposed in a viewer space;

a third operation of receiving a payment from the viewer terminal (130) for screening the video in accordance with the number of viewers when the booking information corresponds to the counted number of viewers; and a fourth operation of providing an externally received video to the display (110) or the viewer terminal (130), wherein the second operation comprises:

a 2-1 operation of estimating an age of each individual of the counted actual viewers using a facial recognition algorithm;

a 2-2 operation of providing an authentication mark to the display (110) and text instructing a viewer terminal (130) of a specific viewer to perform authentication when an age of a viewer estimated in the 2-1 operation is lower than an age limit of the externally received video;

a 2-3 operation of receiving an authentication signal of at least one viewer terminal (130) that has photographed the authentication mark displayed on the display (110) and checking personal information including an age in conjunction with a communication service provider of the viewer terminal (130) from which the authentication signal has been received; and a 2-4 operation of receiving a recorded voice signal of a viewer from the at least one viewer terminal (130) that has photographed the authentication mark displayed on the display (110) and estimating an age through a voice recognition algorithm.

4. The method of claim 3, further comprising, after the fourth operation, a fifth operation of additionally receiving a payment for screening the video in accordance with an added number of viewers when the number of actual viewers increases.

5. The method of claim 3, further comprising, when at least one viewer is under the age limit of the video, stopping providing the video or partially mosaicking the video provided on the display (110) or partially removing sound from the video in accordance with preset viewing restriction information.

\* \* \* \* \*